United States Patent
Iimori et al.

(10) Patent No.: US 7,156,455 B2
(45) Date of Patent: Jan. 2, 2007

(54) SUNROOF PANEL FOR A VEHICLE

(75) Inventors: Yasushi Iimori, Aichi-ken (JP); Kotaro Oami, Aichi-ken (JP); Yoji Yano, Osaka-Fu (JP); Yusuke Kagotani, Osaka-Fu (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 11/086,213

(22) Filed: Mar. 21, 2005

(65) Prior Publication Data

US 2005/0206201 A1     Sep. 22, 2005

(30) Foreign Application Priority Data

Mar. 22, 2004   (JP)   ............................. 2004-083103

(51) Int. Cl.
   *B60J 10/12*   (2006.01)
(52) U.S. Cl. .................................... 296/216.09
(58) Field of Classification Search ..............................
   296/216.06–216.09
   See application file for complete search history.

(56) References Cited

U.S. PATENT DOCUMENTS 6,283,542 B1 * 9/2001 Patz .......................... 296/211
6,517,150 B1 * 2/2003 De Gaillard et al. ... 296/216.06

FOREIGN PATENT DOCUMENTS

| JP | 05-185839 | 7/1993 |
|----|-----------|--------|
| JP | 05-213072 | 8/1993 |
| JP | 408058392 | * 3/1996 |

* cited by examiner

*Primary Examiner*—Dennis H. Pedder
(74) *Attorney, Agent, or Firm*—Morgan & Finnegan LLP

(57) ABSTRACT

A sunroof panel is composed of a resin panel and a weather strip. The resin panel is a plate-like resin panel and has a vehicle interior surface and a vehicle exterior surface, which are substantially parallel to each other. The resin panel is attached to a frame by means of a urethane adhesive. The resin panel has a peripheral portion, which extends from a portion sticking to the urethane adhesive to a side face, and a central portion surrounded by the peripheral portion. The peripheral portion is thinner than the central portion. The side face of the resin panel is formed so as to be inclined inwardly toward the vehicle interior surface. An approach-R portion is formed on a peripheral portion of the vehicle exterior surface.

7 Claims, 4 Drawing Sheets

PRIOR ART

SUNROOF PANEL FOR A VEHICLE

BACKGROUND OF THE INVENTION

1. Field of the Invention

The present invention relates to a sunroof panel for a vehicle.

2. Description of the Related Art

JP 05-185839 A discloses a conventional sunroof panel of this type, which is constructed as follows: a resin panel is attached to a frame by means of an adhesive, and a weather strip is fitted so as to straddle both the resin panel and the frame. However such a sunroof panel does not look good because the weather strip can be seen from the outside of the vehicle.

On the other hand, JP 05-213072 A discloses a sunroof panel whose weather strip cannot be seen from the outside, making the panel attractive. FIG. 4 is a cross sectional view of this sunroof panel. A body 42 of a vehicle roof 41 has an opening portion 43. A sunroof panel 44 is fitted into the opening portion 43 so as to be slidable. The sunroof panel 44 is composed of a resin panel 45 and a weather strip 46. A peripheral portion of the opening portion 43 abuts against a first lip portion 46a of the weather strip 46, and a bevel 45a of the resin panel 45 is made to abut against a second lip portion 46b of the weather strip 46. As a result, sealing is effected between the body 42 and the resin panel 45.

However, the sunroof panel of JP 05-213072 A has the following problems. The resin panel 45 is likely to expand and contract in a longitudinally and laterally in relation to the vehicle as the temperature changes but the second lip portion 46b cannot follow the expansion and contraction of the resin panel 45. This is because the amount of thermal expansion and contraction of the resin panel 45 is much larger than the amount of deflection of the second lip portion 46b.

To be more specific, when the resin panel 45 expands, the deflection of the second lip portion 46b is so small that the resin panel 45 pushes on the weather strip 46 and the external sealing position of the weather strip 46 changes. Accordingly, the sealing performance cannot be said to be necessarily satisfactory.

On the other hand, when the resin panel 45 contracts, the second lip portion 46b cannot follow the contraction of the resin panel 45, and a gap is produced between the second lip portion 46b and the resin panel 45. Furthermore, if there is a large variation in the vertical position of the abutment portion between the resin panel 45 and the weather strip 46 at the time of assembly, a gap may be produced at the portion. In this case, the sealing performance cannot be secured at that portion.

SUMMARY OF THE INVENTION

The present invention is made to solve the problems described above. It is an object of the present invention to provide a sunroof panel in which the sealing performance is secured without damaging the appearance of the panel even when the panel expands and contracts due to temperature change.

A sunroof panel according to the present invention includes: a plate-like panel slidably fitted into an opening portion formed in a body of a vehicle roof, the panel having opposing vehicle exterior and vehicle interior surfaces; and a weather strip provided between the opening portion and the panel to seal therebetween, the weather strip having a lip portion which elastically abuts against the vehicle interior surface of the panel to seal.

DESCRIPTION OF THE PREFERRED EMBODIMENTS

Embodiments of the present invention will be described below with reference to the accompanying drawings.

First Embodiment

Figure 1:
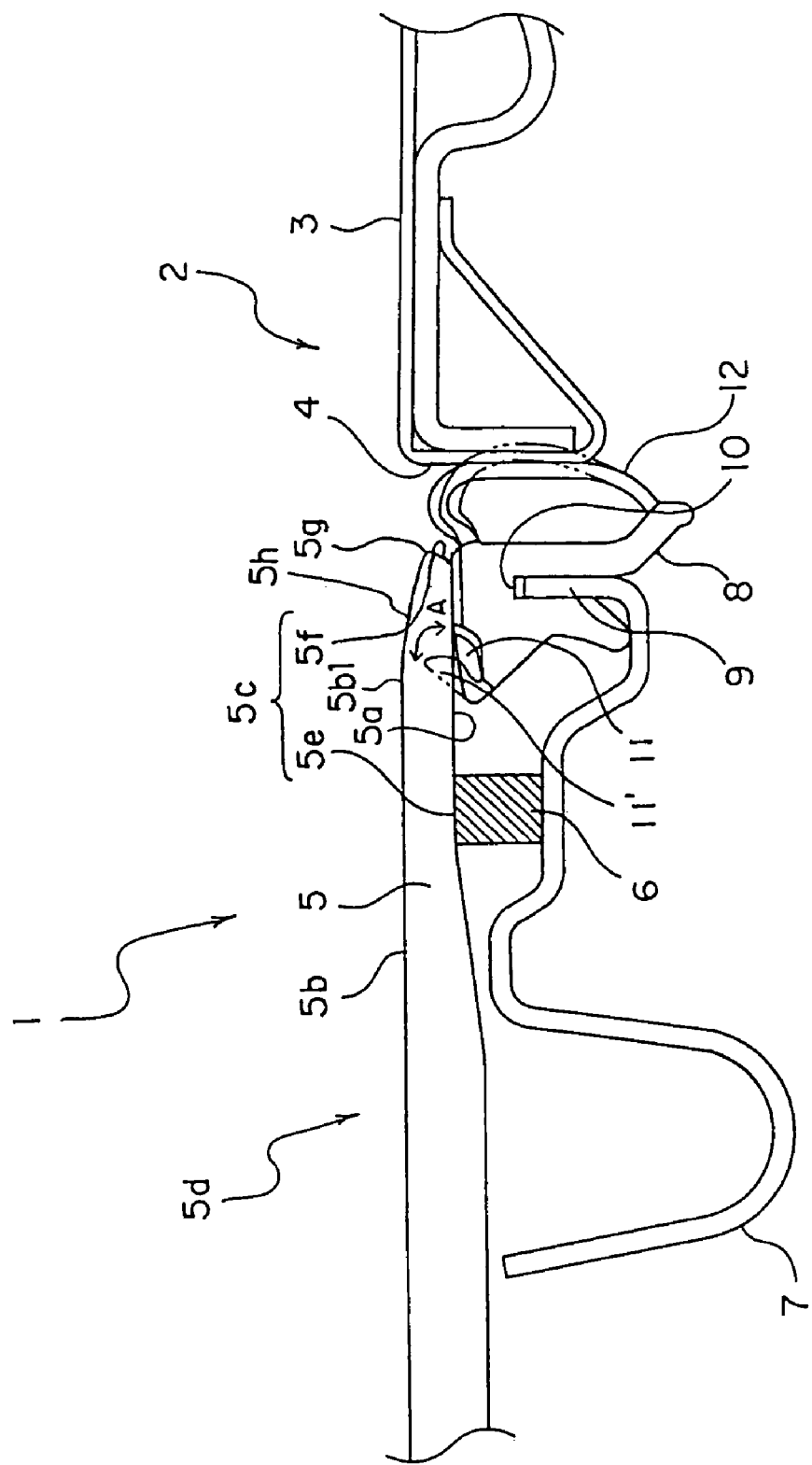
FIG. 1 is a cross sectional view of a sunroof panel according to a first embodiment of the present invention.

Referring to FIG. 1, a sunroof panel 1 according to a first embodiment of the present invention is fitted into an opening portion 4 so as to be slidable. The opening portion 4 is formed in a body 3 of a vehicle roof 2.

The sunroof panel 1 is composed of a resin panel 5 and a weather strip 8. The resin panel 5 is a plate-like resin panel and has a vehicle interior surface 5a facing the interior of the vehicle and a vehicle exterior surface 5b facing the exterior of the vehicle, which are substantially parallel to each other. The resin panel 5 is attached to a frame 7 by means of a urethane adhesive 6. The resin panel 5 has a peripheral portion 5c, which extends from a portion 5e sticking to the urethane adhesive 6 to a side face 5f, and a central portion 5d surrounded by the peripheral portion 5c. The peripheral portion 5c is thinner than the central portion 5d.

The side face 5f of the resin panel 5 is formed so as to be inclined inwardly toward the vehicle interior surface 5a.

On a peripheral portion of the vehicle exterior surface 5b, a rounded corner, i.e., an approach-R portion 5h is formed between a rounded corner end portion 5b1 which serves as a starting point of the rounded corner on the vehicle exterior surface 5b and a peripheral edge portion 5g.

The weather strip 8 is attached to the frame 7 by inserting a flange portion 9 of the frame 7 into a groove 10 of the weather strip 8. A lip portion 11 is formed integrally with the weather strip 8 so as to be pivotable with respect to the weather strip 8 in a direction indicated by an arrow A. Before attaching the resin panel 5, the lip portion 11 is located at a position as represented by 11' drawn with a dotted line. Attachment of the resin panel 5 causes the lip portion 11 to pivot to locate itself at a position as represented by 11 drawn with a solid line between the weather strip 8 and the resin panel 5. The action of the lip portion 11 tending to return to the position as represented by 11' elastically seals between the resin panel 5 and the weather strip 8.

The weather strip 8 has a hollow side-face sealing portion 12 that is made to abut against the opening portion 4 for sealing between the sunroof panel 1 and the opening portion 4.

As described above, because the lip portion 11 seals between the resin panel 5 and the weather strip 8 on the vehicle interior surface 5a, the weather strip 8 can follow the thermal expansion and contraction of the resin panel 5 in the horizontal direction, whereby tension of the weather strip 8 is ensured. Accordingly, the sealing performance can be secured.

Also, because the weather strip 8 can not be seen from the outside of the vehicle, it is possible to provide a sunroof panel having an attractive appearance with the resin panel 5 being flush with the body 3.

Additionally, as the peripheral portion 5c of the resin panel 5 is thinner than the central portion 5d, the height of the resin panel 5 and the weather strip 8 can be small when they are attached to the vehicle, which can lead to an improvement in the appearance of the interior of the vehicle.

Further, since the side face 5f of the resin panel 5 is formed so as to be inclined inwardly toward the vehicle interior surface 5a, the cut end of the side face 5f becomes less conspicuous, which improves the appearance of the sunroof panel 1.

Further, since the approach-R portion 5h is formed, it is possible to prevent noise due to wind during driving from being generated even if the attachment position of the sunroof panel 1 varies with respect to the upward direction.

Second Embodiment

Figure 2:
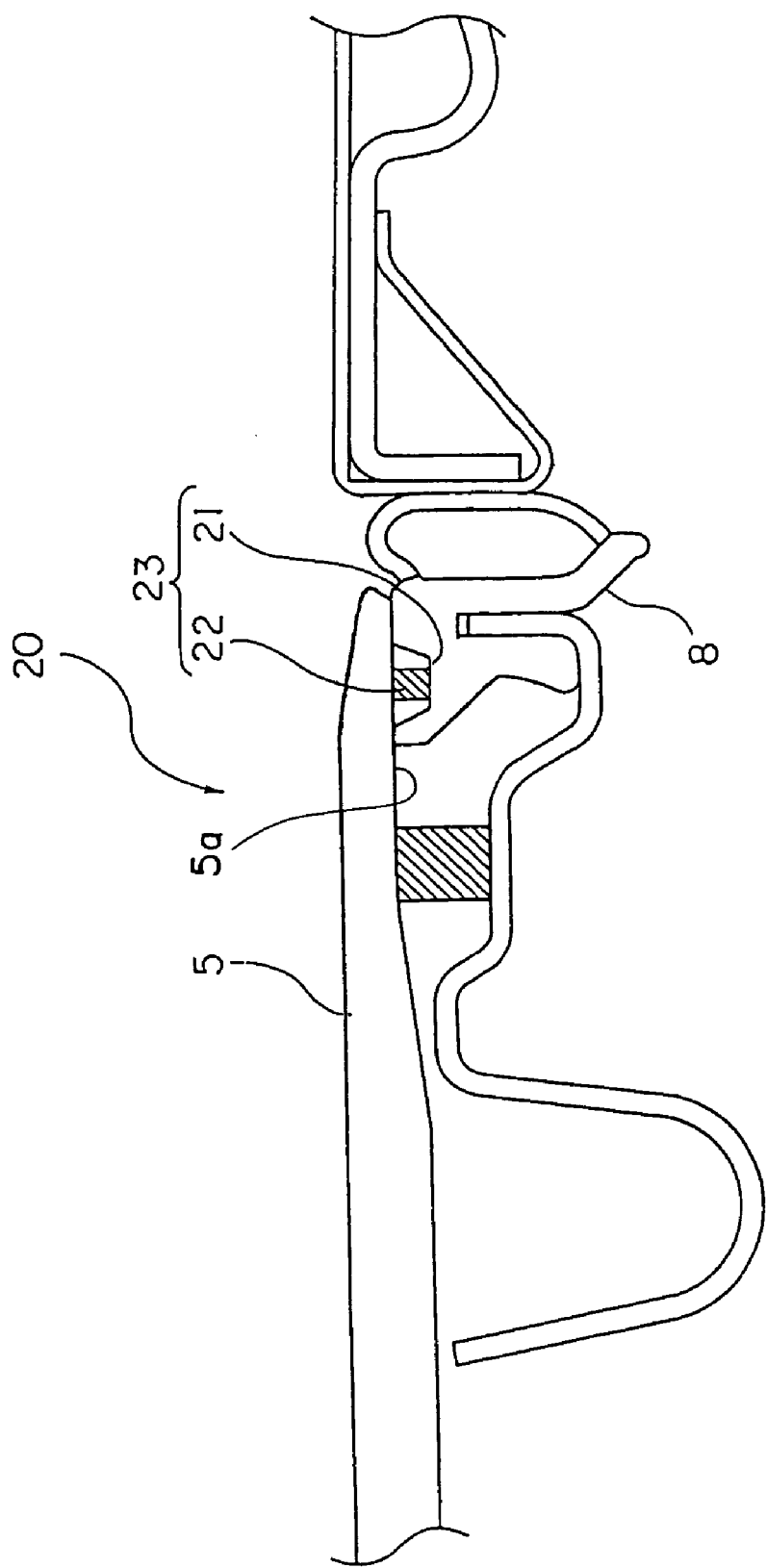
FIG. 2 is a cross sectional view of a sunroof panel according to a second embodiment of the present invention.

Referring to FIG. 2, a sunroof panel according to a second embodiment of the present invention will be described. It should be noted that in the following embodiments, components that are the same as or similar to those described in the first embodiment are denoted by the same symbols, and therefore the detailed description thereof is omitted.

As shown in FIG. 2, a sunroof panel 20 has a lip portion 23 whose shape is different from that of the lip portion in the first embodiment.

A recess 21 is formed in the weather strip 8 that is made to abut against the vehicle interior surface 5a of the resin panel 5. A urethane adhesive 22 is provided within the recess 21 for sealing between the resin panel 5 and the weather strip 8. In this case, the recess 21 and the urethane adhesive 22 constitute the lip portion 23.

As described above, because the recess 21 is formed in the weather strip 8 and the urethane adhesive 22 is provided within the recess 21, as in the first embodiment, the lip portion 23 can seal between the resin panel 5 and the weather strip 8 on the vehicle interior surface 5a, which makes it possible for the weather strip 8 to follow the thermal expansion and contraction of the resin panel 5. Therefore, an attractive sunroof panel can be realized while securing the sealing performance.

Third Embodiment

Figure 3:
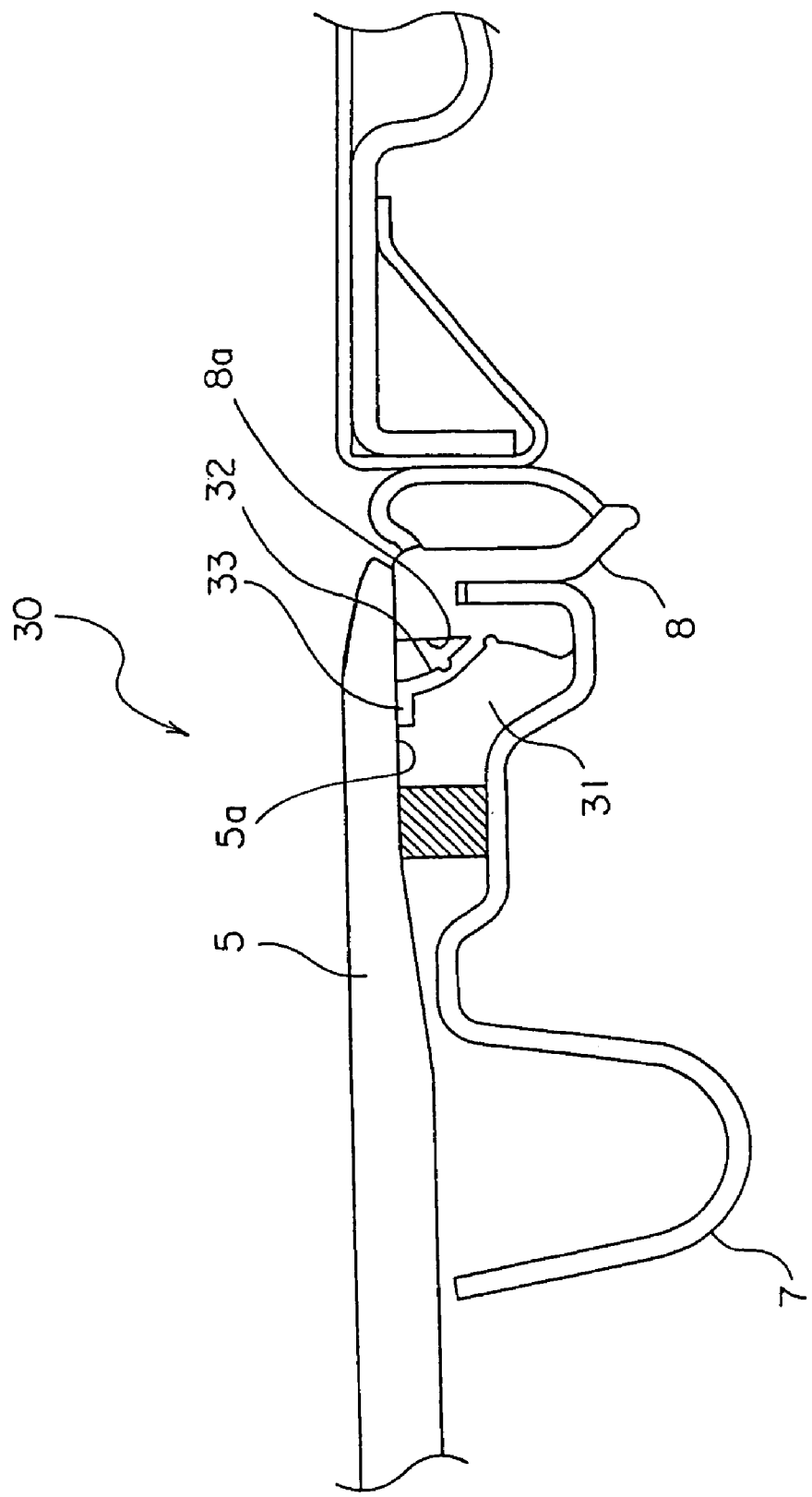
FIG. 3 is a cross sectional view of a sunroof panel according to a third embodiment of the present invention.
Figure 4:
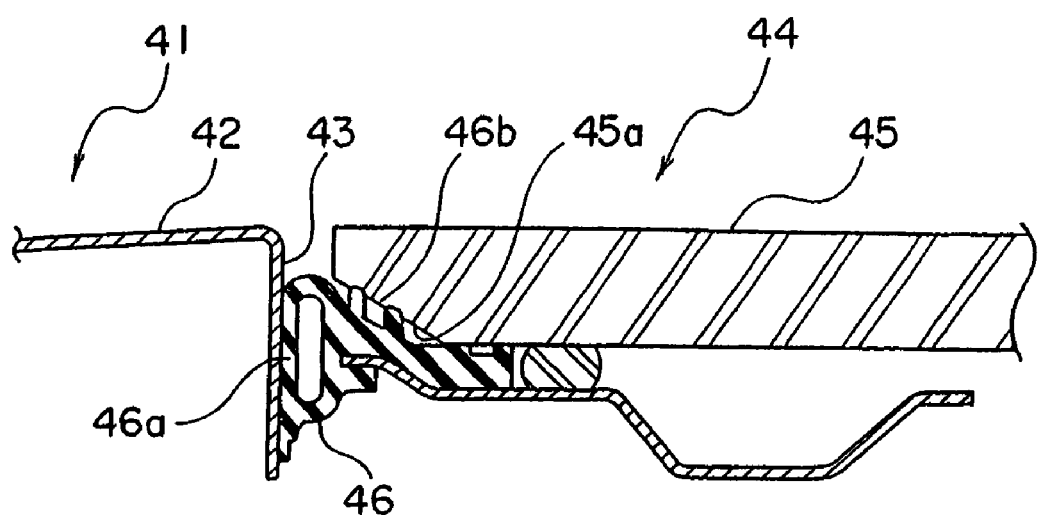
FIG. 4 is a cross sectional view of a conventional sunroof panel.

Referring to FIG. 3, a sunroof panel according to a third embodiment of the present invention will be described.

As shown in FIG. 3, a sunroof panel 30 has a lip portion 33 whose shape is different from that of the lip portion in the first embodiment.

The weather strip 8 has a surface 8a that is exposed to a space 31 formed by the resin panel 5 and the frame 7. An arm portion 32 extending upward is formed integrally with the weather strip 8 on the surface 8a. The lip portion 33 is provided at the end of the arm portion 32. A force applied to the lip portion 33 from above causes the arm portion 32 to move elastically.

When the resin panel 5 is attached to the frame 7, the vehicle interior surface 5a is made to abut against both the weather strip 8 and the lip portion 33. A force is applied to the lip portion 33 downwardly by the resin panel 5, and the arm portion 32 moves elastically so as to absorb the force. Thus, the lip portion 33 seals between the resin panel 5 and the weather strip 8.

As described above, because the lip portion 33 seals between the resin panel 5 and the weather strip 8 on the vehicle interior surface 5a as in the first and second embodiments, the weather strip 8 can follow the thermal expansion and contraction of the resin panel 5. Therefore, an attractive sunroof panel can be realized while securing the sealing performance.

What is claimed is:

1. A sunroof panel for a vehicle, comprising:
   a plate-like panel slidably fitted into an opening portion formed in a body of a vehicle roof, the panel having opposing vehicle exterior and vehicle interior surfaces; and
   a weather strip provided between the opening portion and the panel to seal therebetween, the whole of the weather strip being substantially diposed at a height lower than the panel exterior surface,
   the weather strip having a projecting flange forming a lip portion which elastically abuts against the vehicle interior surface of the panel, the weather strip and the panel interior surface contacting each other exclusively along a substantially horizontal portion of the panel interior surface.

2. A sunroof panel according to claim 1, wherein the lip portion is pivotably provided to the weather strip.

3. A sunroof panel according to claim 1, wherein a recess is formed in the weather strip, a urethane adhesive is provided within the recess and the vehicle interior surface of the panel is sealed by the weather strip and the urethane adhesive.

4. A sunroof panel according to claim 1, wherein the flange forms an arm portion provided with a surface of the weather strip, the arm portion extending upward and being capable of moving elastically, characterized in that the lip portion is provided at the end of the arm portion.

5. A sunroof panel according to claim 1, wherein a peripheral portion of the panel is thinner than a central portion of the panel.

6. A sunroof panel according to claim 1, wherein a side face of the panel is formed so as to be inclined inwardly toward the vehicle interior surface.

7. A sunroof panel according to claim 1, further comprising a rounded corner formed on a peripheral portion of the vehicle exterior surface of the panel.

* * * * *